(12) United States Patent
Krammer

(10) Patent No.: US 8,530,074 B2
(45) Date of Patent: Sep. 10, 2013

(54) RECHARGEABLE BATTERY WITH INDUCTIVE CHARGE BALANCING

(75) Inventor: Gert Krammer, Graz (AT)

(73) Assignee: MAGNA STEYR Battery Systems GmbH & Co OG, Zettling (AT)

( * ) Notice: Subject to any disclaimer, the term of this patent is extended or adjusted under 35 U.S.C. 154(b) by 639 days.

(21) Appl. No.: 12/669,500

(22) PCT Filed: Jul. 18, 2008

(86) PCT No.: PCT/EP2008/059489
§ 371 (c)(1),
(2), (4) Date: May 18, 2010

(87) PCT Pub. No.: WO2009/010590
PCT Pub. Date: Jan. 22, 2009

(65) Prior Publication Data
US 2010/0304207 A1     Dec. 2, 2010

(30) Foreign Application Priority Data

Jul. 18, 2007   (EP) ..................................... 07450127

(51) Int. Cl.
*H01M 6/12* (2006.01)
*H01M 6/46* (2006.01)
*H01M 2/28* (2006.01)
*H01M 2/26* (2006.01)

(52) U.S. Cl.
USPC ................. 429/162; 429/161; 320/6; 320/15; 320/7

(58) Field of Classification Search
None
See application file for complete search history.

(56) References Cited

U.S. PATENT DOCUMENTS

| | | | |
|---|---|---|---|
| 5,594,320 A | 1/1997 | Pacholok et al. | |
| 5,659,237 A * | 8/1997 | Divan et al. | 320/119 |
| 5,821,729 A | 10/1998 | Schmidt et al. | |
| 6,356,055 B1 | 3/2002 | Lin et al. | |
| 6,458,485 B2 * | 10/2002 | Yanai et al. | 429/211 |
| 2003/0013015 A1 * | 1/2003 | Klein et al. | 429/210 |

FOREIGN PATENT DOCUMENTS

| | | |
|---|---|---|
| DE | 4422409 | 1/1996 |
| DE | 19533543 | 3/1996 |

* cited by examiner

*Primary Examiner* — Barbara Gilliam
*Assistant Examiner* — Jennifer Rea
(74) *Attorney, Agent, or Firm* — Bachman & LaPointe, P.C.

(57) ABSTRACT

A battery (1) having at least two serially connected cells (3', 3") located one above the other in a stack (2) and having flat electrodes (4, 5), the ends of the stack (2) forming the poles (9, 10) of the battery and the electrodes (4, 5) comprising connecting wires (11, 12) protruding sideways from the stack (2), at least one of the connecting wires (11, 12) of all cells (3', 3") being inductively coupled via a common core (13) extending approximately in the longitudinal axis of the stack, and the connecting wires (11, 12) of a first group of cells (3') being coupled in an inductively opposite fashion to the connecting wires (11, 12) of a second group of cells (3").

12 Claims, 3 Drawing Sheets

RECHARGEABLE BATTERY WITH INDUCTIVE CHARGE BALANCING

BACKGROUND OF THE INVENTION

The present invention relates to a rechargeable battery having at least two series-connected cells which are located one above the other in a stack and have flat electrodes, wherein the ends of the stack form the poles of the rechargeable battery, and the electrodes have connecting lines which emerge from the stack at the side.

Recently, rechargeable batteries such as these have also been used in electrical drive systems for motor vehicles, in order to form high rechargeable-battery pole voltages of more than 100 V by stacking and series connection of an appropriately large number of flat cells.

However, the series connection of the cells has the disadvantage that all the cells are charged with the same charging current, and therefore even minor quality differences between the individual cells lead to different states of charge. Numerous circuits for charge balancing between the individual cells have therefore already been proposed, which access the individual electrodes of the cells and are either based on individual-cell charge destruction via a resistance network, cell recharging via capacitors, or inductive energy transmission between the cells. The latter variant is referred to as inductive charge balancing and is described, for example, in the documents DE 195 33 543 A1 and DE 44 22 409 A1.

In the case of inductive charge balancing, the individual cells are connected alternately via switches to coils, which are inductively coupled via a common core. The energy which is emitted from a cell with a relatively high state of charge is converted in the build-up of a magnetic field, whose dissipation is converted back to charge energy for a cell with a lower state of charge when the switch is switched over, thus resulting in a charge equalization between all the cells as the switching process progresses. Inductive charge balancing has the major advantage that it automatically results in galvanic isolation of the cells. However, one disadvantage is the high level of wiring complexity for the connection of the individual cells to the coils which are used for energy charge changing. In the case of rechargeable batteries which are formed from a large number of cells, for example tens or hundreds of cells, the high level of wiring complexity is at the moment prohibitive for practical use of inductive charge balancing.

The aim of the invention is to overcome the described disadvantages of the prior art and to provide a rechargeable battery composed of stacked cells which allows operation with inductive charge balancing in a simple and cost-effective manner.

SUMMARY OF THE INVENTION

This aim is achieved by a rechargeable battery of the type mentioned initially which, according to the invention, is distinguished in that at least the one set of connecting lines of all the cells are inductively coupled via a common core which extends approximately in the stack longitudinal direction, wherein the connecting lines of a first group of cells are inductively coupled in the opposite sense to the connecting lines of a second group of cells.

This for the first time results in a compact unit comprising a rechargeable battery stack and core, in which the core extends over the entire length of the stack, preferably at right angles to the flat electrodes. This allows the connecting lines which originate from the electrodes to pass by the core directly and without complex intermediate wiring, in order to be passed or routed around the core, through it, or in some other desirable manner in order to create their inductive coupling. After passing the common core, the connecting lines can then be connected in a conventional manner by means of switches for appropriate switching of the inductances created in this way.

It is particularly advantageous for each of said connecting lines to pass by the core on the plane of its flat electrode. The arrangement according to the invention is therefore particularly suitable for a layer structure with a multiplicity of very thin electrodes, for example electrodes manufactured from sheets, whose connecting lines can be routed directly and without crossing.

Provision is preferably made for each electrode to be manufactured integrally with its connecting line, thus resulting in great cost advantages for mass production.

The design of the rechargeable battery according to the invention can be further unified and simplified if the said first set of connecting lines in the first group originate from the positive electrodes of the cells and those in the second group originate from the negative electrodes of the cells, or vice versa.

The coupling can be even further enhanced if, according to a further preferred feature of the invention, the respective other connecting lines are also routed over the core in the corresponding coupling sense, such that both connecting lines of a cell contribute to the formation of the inductance.

A further advantageous embodiment of the invention is distinguished in that the core is a U-core or O-core, whose longitudinal limbs pass through the stack, wherein said first set of connecting lines of the cells, bounded by slots from their electrode, pass through between the longitudinal limbs, while in contrast the respective other electrodes of the cells have a separating slot between the longitudinal limbs. This embodiment achieves an optimum of compactness and efficiency: the core is integrated directly in the stack, and the connecting lines are machined directly out of the electrodes, thus minimizing the material requirement. In this way, the connecting lines for carrying current are easily produced equally in the desired sense at right angles to the core extent by production of slots in the electrodes, that is to say the connecting lines act as half-turns or partial turns around the core and are inductively coupled via the core, without requiring any special wiring.

In one alternative preferred embodiment, the core may have at least two longitudinal limbs which are connected via at least one lateral limb and pass through the stack, wherein said first set of connecting lines of the cells, bounded by slots from their electrode, pass through between the longitudinal limbs in a meandering shape. By way of example, the core could have three longitudinal limbs and one lateral limb in the form of an "E".

In this case, it can preferably be provided that the respective other connecting lines of the cells, bounded by slots from their electrode, pass through between the longitudinal limbs in an opposite meandering shape; alternatively, the respective other electrodes of the cells have a separating slot between the longitudinal limbs. In both cases, this easily results in said opposite coupling of the two groups of cells, with even greater coupling being achieved in the first case.

The cells in the first group and those in the second group preferably alternate with one another, thus further simplifying the design and optimizing the charge balancing by the subdivision of the cells into two groups of equal size.

It is particularly advantageous if the mutually adjacent electrodes of two adjacent cells are combined to form a common so-called "bipolar" electrode, which is known per se, thus making it possible to save further material.

For the same reason, it is particularly advantageous for the connecting lines of the mutually adjacent electrodes of two adjacent cells to also be combined to form a common bipolar connecting line.

One possible type of connection of the rechargeable battery according to the invention consists in that the connecting lines of each cell are connected via a controlled switch, wherein at least one switch for the first group of cells and at least one switch for the second group of cells are operated alternately.

A further preferred embodiment of the invention is distinguished in that the core is provided with an auxiliary winding for outputting secondary power and/or for charging the rechargeable battery. On the one hand, this allows power to be taken from the rechargeable battery even if there is an interruption in the load circuit of the rechargeable battery, which also provides the capability for voltage transformation in the form of a DC/DC converter, as will also be explained further below. On the other hand, it is even possible to charge the rechargeable battery with inductive balancing at the same time via this auxiliary winding.

The invention is suitable for any type of rechargeable battery with flat electrodes. However, the rechargeable battery is preferably a lithium-ion or lithium-polymer rechargeable battery, which types are distinguished by high power density and being highly suitable for inductive charge balancing.

BRIEF DESCRIPTION OF THE DRAWINGS

The invention will be explained in more detail in the following text with reference to exemplary embodiments which are illustrated in the attached drawings, in which.

DETAILED DESCRIPTION

Figure 1:
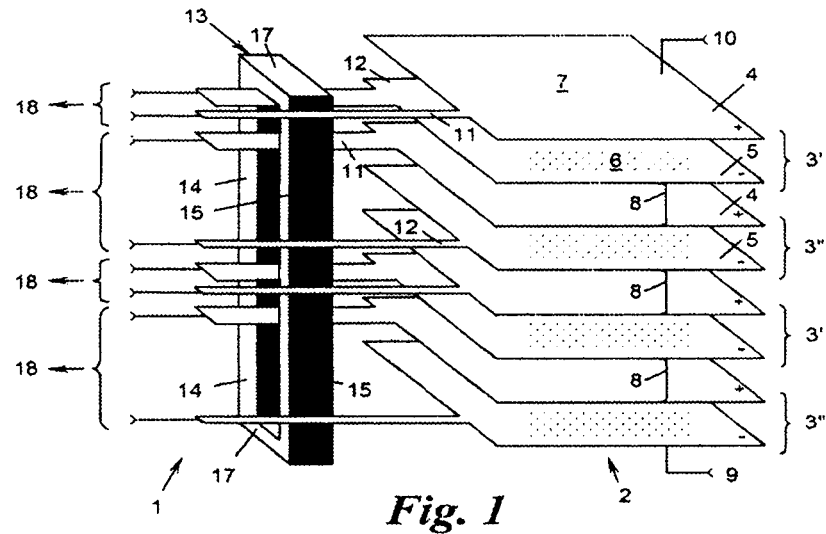
FIG. 1 shows a schematic perspective view of a first embodiment of the rechargeable battery according to the invention.

FIG. 1 shows a rechargeable battery 1 which has a stack 2 of (in this case) four cells 3', 3" located one above the other. Each cell 3', 3" comprises a flat positive electrode 4 and a flat negative electrode 5, as well as a chemical structure or electrolyte 6 located between them.

The cells 3', 3" may be of any type known from technology, for example lithium-ion cells, lithium-polymer cells etc. The precise internal design of the cells 3', 3" is not the subject matter of the invention, and will therefore not be explained in any more detail; for the purposes of the present invention, it is sufficient to mention that the cells 3', 3" are flat, that is to say they have a relatively large lateral and longitudinal extent on their plane 7 in comparison to the thickness of their electrodes 4, 5 and their electrolyte 6. By way of example, thin vapor-deposited carrier films are used for the electrodes 4, 5 in modern lithium-ion cells with metallic layers, as a result of which the flat electrodes 4, 5 and cells 3', 3" are in the form of films, and are flexible.

The term "flat" electrodes or cells accordingly in the present disclosure covers not only planar but also curved, corrugated electrodes and cells or electrodes and cells deformed in some other way, provided they are flat in the described sense.

The outlines of the electrodes 4, 5 and therefore of the entire cell stack 2 may be chosen as required and may thus, for example, be matched to an available installation space. In the preferred use in motor vehicles, the rechargeable battery 1 can in this way, for example, fill existing vehicle cavities with an accurate fit, or even may itself be formed as a vehicle part, for example as a trunk base, seat substructure, internal door lining, etc.

The cells 3', 3" in the stack 2 are connected in series, as is indicated schematically by the connections 8. In one practical embodiment, the respectively mutually adjacent electrodes 5, 4 of two adjacent cells 3', 3" rest on one another over their entire area, in order to make contact with them, or are completely combined to form a common, so-called "bipolar" electrode.

The ends of the stack 2 form the two poles 9, 10 of the rechargeable battery 1. The electrodes 4, 5 of the cells 3', 3" are additionally provided with connecting lines 11, 12 which emerge from the stack 2 at the side. The connecting lines 11, 12 preferably run on the same plane 7 as the electrodes 4, 5; in particular, they are formed integrally with them, for example by being cut from the same (coated) film.

The connecting lines 11, 12 of the cells 3', 3" pass by a core 13 composed of magnetically highly permeable material, for example soft iron or ferrite, to be precise such that they are inductively coupled to one another during operation, that is to say when currents are flowing via the connecting lines 11, 12.

In the embodiment shown in FIG. 1, the core 13 is a toroidal core or O-core with two longitudinal limbs 14, 15, which are closed via two lateral limbs 17 to form the ring or "O". (If desired, one of the lateral limbs 17 could be omitted, thus resulting in a U-core, although this reduces the coupling and inductance). The term "O-core" means any desired types of cores with a closed magnetic circuit, such as toroidal cores, elliptical O-cores, polygonal O-cores, U-cores with a yoke, etc.

The longitudinal limbs 14, 15 of the core 13 extend over the entire longitudinal direction of the stack 2, to be precise preferably at right angles to the planes 7 of the electrodes 4, 5 (alternatively, the core 13 could also run at an angle of other than 90° to the planes 7 over the longitudinal extent of the stack 2, in particular if special installation requirements made this necessary). In the embodiment shown in FIG. 1, the core 1 runs directly alongside the stack 2 and may, for example, be assembled closely to it.

Figure 2:
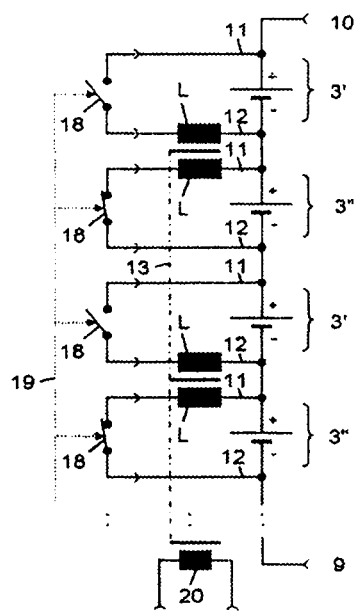
FIG. 2 shows a block diagram of the rechargeable battery shown in FIG. 1.

The ends of the connecting lines 11, 12 are accessible for further connection after passing the core 13. FIG. 2 shows one preferred type of connection.

As shown in FIG. 2, the ends of the connecting lines 11, 12 of each cell 3', 3" are connected via a controlled switch 18. The inductances L which are in each case formed when the connecting lines 11, 12 pass the core 13 are shown as circuit diagram symbols in FIG. 2.

As can be seen from FIGS. 1 and 2, the connecting lines 11, 12 are passed through or around the core 13 such that the inductive coupling between the connecting lines in a first group 3' of the cells is precisely the opposite of that of a second group 3" of the cells, wherein the cells in the first group 3' and in the second group 3" alternative with one another (the latter is not essential, but simplifies the layer structure, as will also be explained later).

If the switches 18 for the first group 3' and those for the second group 3" of cells are now each closed alternately-controlled by a control clock 19, then this results in an alternating current flow through the inductances L, which leads to an alternating magnetic field being formed in the core 13, which in turn induces correspondingly alternating voltages in the inductances L and the connected cells. Overall, this leads to energy balancing between the cells 3', 3" with a higher state of charge and cells 3', 3" with a lower state of charge, which is known as inductive balancing.

If desired, auxiliary power or secondary power can be taken via an auxiliary winding 20 on the core 13 from the alternating magnetic field in the core 13 and can be used, for example, to feed further electrical components—independently of the load circuit on the poles 9, 10 of the rechargeable battery. By way of example, this avoids the need for a separate DC/DC converter for feeding such components; a rechargeable battery 1 which is operated in the inductive charge balancing mode thus produces, as a "byproduct" an additional AC voltage, which can be selected by the number of turns on the auxiliary winding 20 and can also be rectified, in order to replace a DC/DC converter.

Furthermore, the auxiliary winding 20 can even be used for charging the rechargeable battery, if it is fed with alternating current, in which case the charging takes place with inductive balancing at the same time.

In the simplest case, as is shown in FIG. 1, only the one set of connecting lines 11 or 12 of each cell 3', 3" pass by the core 13 in each case, or are passed through it—in the corresponding winding sense, in order to achieve the desired coupling direction as shown in FIG. 2. This is illustrated in detail in FIG. 3. The connecting line 11 from the positive electrode 4 of the cell 3' in the first group passes the core 13 at a distance; the connecting line 12 from the negative electrode 5 of the cell 3' in the first group passes through the core 13; the connecting line 11 from the positive electrode 4 of the cell 3" in the second group likewise passes through the core 13; and the connecting line 12 from the negative electrode 5 of the cell 3" in the second group once again passes by the core 13 at a distance. Because of the reverse polarities of the connecting lines which pass through the core 13 here, the electromagnetic coupling of the connecting line 12 from the cell 3' in the first group is therefore inductive, that is to say it is in the opposite sense to that of the connecting line 11 from the cell 3" in the second group, with respect to the magnetic flux direction in the core 13.

Figures 3, 4:
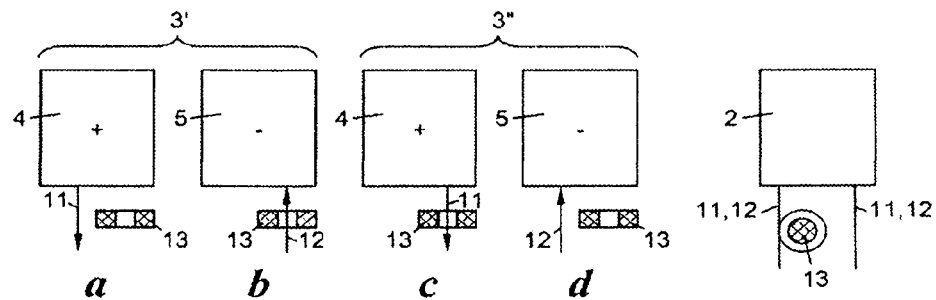
FIG. 3 shows a plan view of the first four electrodes of the rechargeable battery from FIG. 1.
FIGS. 4 to 7 show further embodiments of the rechargeable battery according to the invention, in the form of an overall plan view (FIGS. 4, 6) and individual plan views of the first four electrodes (FIGS. 3a-d, 5a-d)

FIG. 4 shows a first alternative embodiment with a core 13 in the form of a rod, around which the connecting lines 11 from the cells 3' in the first group and the connecting lines 12 from the cells 3" in the second group are in each case passed, in the form of one or more turns, while the connecting lines 12 from the cells 3' in the first group and the connecting lines 11 from the cells 3" in the second group pass by the core 13, at a distance.

Figures 5, 6:
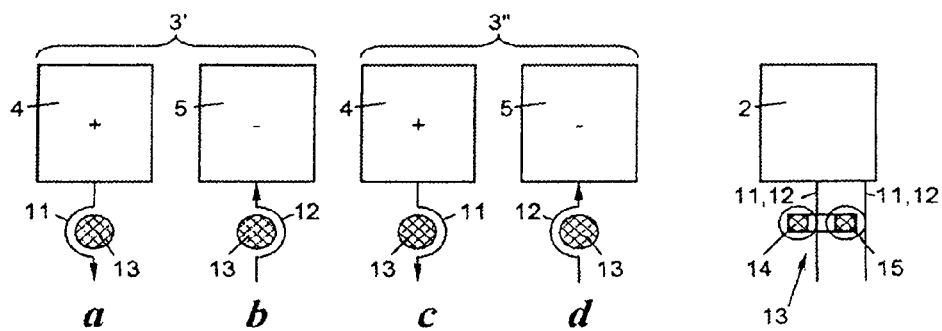

FIG. 5 shows a further alternative embodiment with a core 13 in the form of a rod, around which all the connecting lines 11, 12 from all the cells 3', 3" are in each case passed in the form of half a turn, to be precise in each case in the illustrated direction sense and winding sense, in order to achieve the desired opposite coupling between the cells 3' in the first group and the cells 3" in the second group.

FIG. 6 also shows a further embodiment with an O-core 13 as in FIGS. 1 and 3, around each of whose longitudinal limbs 14, 15 all the connecting lines 11, 12 from all the cells 3', 3" are passed in the form of one or more turns, once again with the direction sense and winding sense being chosen such that the corresponding inductive coupling directions as shown in FIG. 2 are achieved.

The embodiments in FIGS. 3 and 5 have the advantage that they do not require the connecting lines to cross over anywhere, as is particularly suitable for a flat, integral layer structure as shown in FIG. 1.

Figure 7:
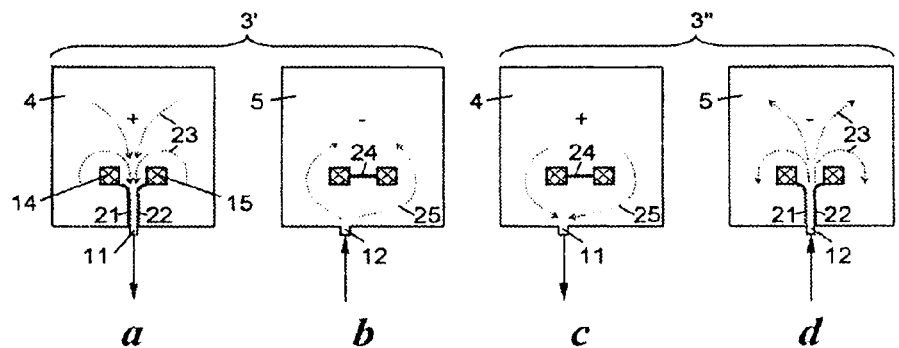
Figure 8:
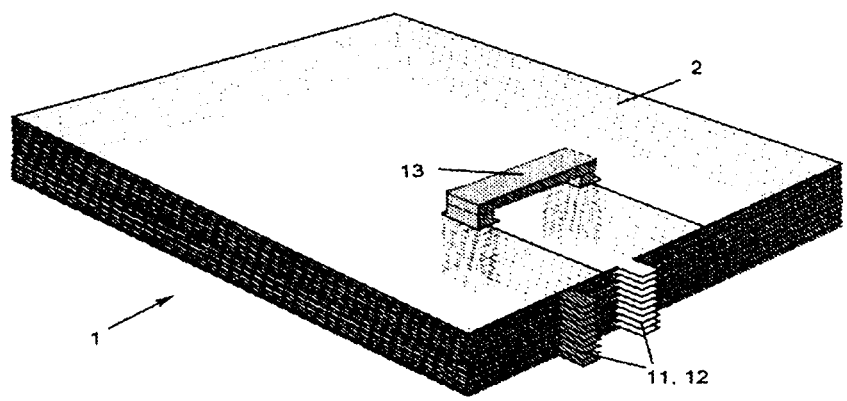
FIG. 8 shows a schematic perspective view of the rechargeable battery shown in FIG. 7.

FIGS. 7 and 8 show a further, particularly compact embodiment with high coupling and without any line crossings. In this embodiment, the longitudinal limbs 14, 15 of the O-core 13 pass through the entire stack 2 of cells 3', 3", and the connecting lines 11, 12 are, as it were, "integrated" into the electrodes 4, 5, to be precise in the following manner.

Those connecting lines 11 from the positive electrodes 4 of the cells 3' in the first group which in this case pass through the O-core 13 are bounded by two slots 21, 22 from the rest of the area of the respective electrode 4 or 5. The slots 21, 22 in this case each extend from the point where the longitudinal limbs 14, 15 of the core 13 pass through to the edge of the electrodes 4, 5, such that that part of the electrodes which remains between the slots 21, 22 at the same time forms their respective connecting line 11, 12, which passes through the core 13, as indicated by the current flow lines 23.

The respective other electrodes 5 of the cells 3' in the first group and electrodes 4 of the cells 3" in the second group have a separating slot 24 between the points where the longitudinal limbs 14, 15 of the core 13 pass through, which prevents currents from passing through the core 13 here, and in fact forces them to flow externally past the core 13 (as shown in FIG. 3), as indicated by the current flow lines 25.

If the connecting lines 11, 12 of the embodiment shown in FIG. 7 are connected to switches 18 as shown in FIG. 2, this in each case results in opposite inductive coupling between the cells 3' in the first group and those 3" in the second group.

As can be seen from FIGS. 7 and 8, this embodiment is particularly suitable for combining the respectively mutually adjacent electrodes 4, 5 of two adjacent cells 3', 3", since these mutually adjacent electrodes have precisely the same configuration. They can therefore be combined directly to form a common, even integral, "bipolar" electrode.

Figure 9:
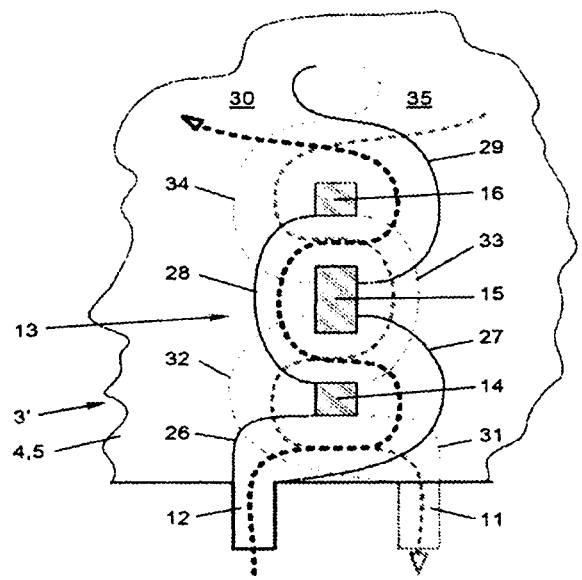
FIG. 9 shows a further embodiment of the rechargeable battery according to the invention, in the form of an overall plan view of the first two electrodes.

FIG. 9 also shows a further embodiment, in which an E-core with three longitudinal limbs 14, 15, 16 is used instead of an O-core with two longitudinal limbs 14, 15, and these three longitudinal limbs 14, 15, 16 are connected via a lateral limb 17, which is used as a yoke, as shown in FIG. 1 to form the "E". If desired a second, opposite lateral limb 17 can also be used, in order to complete the "E" to form two mutually adjacent "O"s. It is self-evident that the concept shown in FIG. 9 can also be extended to more than three longitudinal limbs 14-16, for example to four, five or more longitudinal limbs.

FIG. 9 shows only the two electrodes 4, 5 of the first cell 3' in the first group (those of the cells 3" in the second group are in mirror-image form). The one connecting line 12 of the negative electrode 5 (shown at the top here) passes in a meandering shape, bounded by slots 26-29 from its electrode 5, between the longitudinal limbs 14-16 of the core 13, until it opens out into the remaining electrode surface at 30. The connecting line 11 of the positive electrode 4 (shown at the bottom here) passes, bounded by slots 31 to 34 from its electrode 4, in an opposite meandering shape between the longitudinal limbs 14-16, until it merges into the remaining electrode surface at 35.

In a further embodiment (not shown), one of the electrodes 4, 5 of the cells 3', 3" could respectively, as a combination of the embodiments shown in FIGS. 7 and 9, simply have slots 24 as shown in the embodiment in FIG. 7 rather than a connecting line routed in meandering shape, although this leads to less coupling.

The cells 3', 3" may, of course, also be connected to their connecting lines 11, 12 in a different manner to that shown in FIG. 2, to be precise in any manner known in technology, in order to achieve inductive charge balancing between the cells. Furthermore, the connecting lines 11, 12 may also be used to measure the cell voltage of the individual cells, or to charge or discharge the cells 3', 3" individually. In addition, the switches 18 can be switched not only in groups and at a constant clock rate, but may also be clocked on a cell-specific basis and as required, for example on the basis of cell-specific charge measurements at the connections 11, 12, in order to also allow cell-specific recharging processes to be carried out between selected cells 3', 3".

The invention is accordingly not restricted to the illustrated embodiments, but also covers all combinations, variations and modifications which fall within the scope of the attached claims.

The invention claimed is:

1. A rechargeable battery comprising at least first and second series-connected cells which are located one above the other in a stack, the first cell and the second cell each have a positive electrode, a negative electrode and an electrolyte located between the positive and negative electrodes wherein a common core passes through the stack and a first connecting line from the positive electrode of the first cell passes adjacent the common core and a second connecting line from the negative electrode of the first cell passes through the common core while a first connecting line from the positive electrode of the second cell passes through the common core and a second connecting line from the negative electrode of the second cell passes adjacent the common core thereby producing reverse polarities of the first and second connecting lines which pass the common core so that an electromagnetic coupling of the second connecting line from the first cell is inductive, that is, opposite to an electromagnetic coupling of the second connecting line of the second cell with respect to a magnetic flux direction in the common core.

2. The rechargeable battery as claimed in claim 1, wherein the electrodes are flat and each of the connecting lines which pass adjacent to the common core is on a plane parallel to its flat electrode.

3. The rechargeable battery as claimed in claim 1, wherein each electrode is integral with its connecting line.

4. The rechargeable battery as claimed in claim 1, wherein the common core is one of a U-core or O-core, having longitudinal limbs which pass through the stack, wherein the first connecting lines of the cells pass through the longitudinal limbs.

5. The rechargeable battery as claimed in claim 1, wherein the common core has at least two longitudinal limbs which are connected via at least one lateral limb and pass through the stack, wherein the first connecting lines of the cells, bounded by slots from their electrode, pass through the longitudinal limbs.

6. The rechargeable battery as claimed in claim 5, wherein the second connecting lines of the cells, bounded by slots from their electrode, pass through the longitudinal limbs in an opposite direction of the first connecting lines.

7. The rechargeable battery as claimed in claim 5, wherein the negative electrodes of the cells have a separating slot between the longitudinal limbs.

8. The rechargeable battery as claimed in claim 1, including a first group of first and second series connected cells and a second group of first and second series connected cells wherein the cells in the first group and those in the second group alternate with one another.

9. The rechargeable battery as claimed claim 1, wherein adjacent electrodes of two adjacent cells are combined to form a common bipolar electrode.

10. The rechargeable battery as claimed in claim 9, wherein connecting lines of the adjacent electrodes of two adjacent cells are combined to form a common bipolar connecting line.

11. The rechargeable battery as claimed in claim 1, wherein connecting lines of each cell are connected via a controlled switch, wherein the switch for the first cell and the switch for the second cell are operated alternately.

12. The rechargeable battery as claimed in claim 1, wherein the rechargeable battery is a lithium-ion or lithium-polymer rechargeable battery.

* * * * *